United States Patent
Wang et al.

(10) Patent No.: US 11,650,428 B2
(45) Date of Patent: May 16, 2023

(54) PROGRESSIVE METALENS FOR SENSING SYSTEM

(71) Applicant: Samsung Electronics Co., Ltd., Suwon-si (KR)

(72) Inventors: Yibing Michelle Wang, Temple City, CA (US); Radwanul Hasan Siddique, Pasadena, CA (US)

(73) Assignee: SAMSUNG ELECTRONICS CO., LTD.

(*) Notice: Subject to any disclaimer, the term of this patent is extended or adjusted under 35 U.S.C. 154(b) by 261 days.

(21) Appl. No.: 16/999,059

(22) Filed: Aug. 20, 2020

(65) Prior Publication Data

US 2021/0389599 A1 Dec. 16, 2021

Related U.S. Application Data

(60) Provisional application No. 63/038,116, filed on Jun. 11, 2020.

(51) Int. Cl.
*G02B 27/10* (2006.01)
*G02B 1/00* (2006.01)
(Continued)

(52) U.S. Cl.
CPC ......... *G02B 27/1066* (2013.01); *G02B 1/002* (2013.01); *G02B 3/14* (2013.01); *G02C 7/06* (2013.01); *G02B 2207/101* (2013.01)

(58) Field of Classification Search
CPC .... G02B 1/002; G02B 3/14; G02B 2207/101; G02B 27/1066; G02B 27/10; G02C 7/06
(Continued)

(56) References Cited

U.S. PATENT DOCUMENTS

| 7,502,178 B2 | 3/2009 | Shenderova et al. |
| 9,995,859 B2 | 6/2018 | Kamali et al. |

(Continued)

FOREIGN PATENT DOCUMENTS

| JP | 2019086765 A | 6/2019 |
| WO | 2019119101 A1 | 6/2019 |
| WO | 2020007622 A1 | 1/2020 |

OTHER PUBLICATIONS

Zheng, Guoxing, et al., "A Dual Field-of-View Zoom Metalens," Optics Letters, vol. 42, Issue 7, Nov. 20, 2016, 12 pages.

(Continued)

*Primary Examiner* — William R Alexander
(74) *Attorney, Agent, or Firm* — Renaissance IP Law Group LLP (57) ABSTRACT

A metalens includes one or more regions of nanostructures. A first region of nanostructures directs a first field of view (FOV) of light incident on the first region of nanostructures to a first region of an image plane. A second region of nanostructures directs a second FOV of light incident on the second region of nanostructures to a second region of the image plane in which the second FOV is different from the first FOV, and the second region of the image plane is different from the first region of the image plane. A third region of nanostructures directs a third FOV of light to a third region of the image plane, in which the third FOV is different from the first FOV and the second FOV, and the third region of the image plane is different from the first region and the second region of the image plane.

20 Claims, 10 Drawing Sheets

(51) Int. Cl.
*G02B 3/14* (2006.01)
*G02C 7/06* (2006.01)

(58) Field of Classification Search
USPC .......................................................... 359/630
See application file for complete search history.

(56) References Cited

U.S. PATENT DOCUMENTS

| | | | |
|---|---|---|---|
| 9,995,930 B2 * | 6/2018 | Arbabi | G02B 27/4272 |
| 10,261,294 B2 | 4/2019 | Park et al. | |
| 10,488,651 B2 | 11/2019 | Kamali et al. | |
| 10,591,643 B2 | 3/2020 | Lin et al. | |
| 11,206,978 B2 * | 12/2021 | Hu | G02B 27/0172 |
| 11,385,450 B2 * | 7/2022 | Kwon | G02B 21/0092 |
| 2015/0002664 A1 | 1/2015 | Eppinger et al. | |
| 2016/0299337 A1 * | 10/2016 | Arbabi | G02B 5/0294 |
| 2017/0212285 A1 | 7/2017 | Arbabi et al. | |
| 2017/0219739 A1 * | 8/2017 | Lin | G02B 5/008 |
| 2019/0064532 A1 | 2/2019 | Riley, Jr. et al. | |
| 2019/0113775 A1 * | 4/2019 | Jang | G02B 5/0236 |
| 2019/0137665 A1 | 5/2019 | You et al. | |
| 2019/0196068 A1 | 6/2019 | Tsai et al. | |
| 2019/0383943 A1 | 12/2019 | Dunn et al. | |
| 2020/0018684 A1 | 1/2020 | Vercruysse | |
| 2020/0058697 A1 | 2/2020 | Meylan | |
| 2020/0116558 A1 | 4/2020 | Pacala et al. | |
| 2020/0348500 A1 * | 11/2020 | Kwon | G01J 9/02 |
| 2021/0307608 A1 * | 10/2021 | Hu | G02B 27/0093 |

OTHER PUBLICATIONS

Kargar, Roya et al., "Reprogrammable multifocal THz metalens based on metal-insulator transition of VO2-assisted digital metasurface," Optics Communications, vol. 462, 2020, 8 pages.
Li, Bo et al., "Metalens-Based Miniaturized Optical Systems," Micromachines 2019, 10(5), 310, 2019, 21 pages.
Liu, Wenwei et al., "Aberration-corrected three-dimensional positioning with a single-shot metalens array," Optica vol. 7, No. 12, Dec. 2020, 8 pages.

* cited by examiner

|              |          |              |
|--------------|----------|--------------|
| Intermediate | Distant  | Intermediate |
| Intermediate | Intermediate | Intermediate |
| Near         | Near     | Near         |

PROGRESSIVE METALENS FOR SENSING SYSTEM

CROSS-REFERENCE TO RELATED APPLICATION

This application claims the priority benefit under 35 U.S.C. § 119(e) of U.S. Provisional Application No. 63/038,116, filed on Jun. 11, 2020, the disclosure of which is incorporated herein by reference in its entirety.

TECHNICAL FIELD

The subject matter disclosed herein relates to image sensors. More particular, the subject matter disclosed herein relates to a progressive metalens may have different focal lengths and FOVs at different areas of the metalens.

BACKGROUND

A greater number of details are usually recognized at the center of the field of view (FOV) of the human vision system, while at the periphery of the FOV only moving objects may be usually monitored. This ability corresponds to a higher-angular resolution at the center of the FOV of human vision and a lower-angular resolution at the periphery. In contrast, image sensors and cameras typically have a constant spatial/angular resolution for the entire FOV of the device. If the resolution of an image sensor or camera is high, the power consumed by reading out sensed image data and by processing the image data may be higher than necessary. A camera having a fisheye lens has very wide FOV; however, the spatial resolution at the center of the fisheye lens is low, which reduces the accuracy of object detection. Consequently, a very wide FOV for an image sensor or camera may not be the best overall solution.

SUMMARY

An example embodiment provides a metalens that may include a first region of nanostructures and a second region of nanostructures. The first region of nanostructures may direct a FOV of light incident on the first region of nanostructures to a first region of an image plane. The second region of nanostructures may direct a second FOV of light incident on the second region of nanostructures to a second region of the image plane in which the second FOV may be different from the first FOV, and in which the second region of the image plane may be different from the first region of the image plane. In one embodiment, the metalens may further include a third region of nanostructures that may direct a third FOV of light incident on the third region of nanostructures to a third region of the image plane in which the third FOV may be different from the first FOV and the second FOV, and in which the third region of the image plane may be different from the first region and the second region of the image plane. In one embodiment, the first region of nanostructures may be arranged to surround the second region of nanostructures and the second region of nanostructures may be arranged to surround the third region of nanostructures. In another embodiment, the first region of nanostructures may be arranged to be adjacent to the second region of nanostructures, and the third region of nanostructures may be arranged to be adjacent to the second region of nanostructures.

An example embodiment provides a metalens that may include a first region of nanostructures and a second region of nanostructures. The first region of nanostructures may directs a first FOV of light incident on the first region of nanostructures to a first region of an image plane, and in which nanostructures of the first region of nanostructures may include at least one layer of nanostructures formed on a substrate. The second region of nanostructures may direct a second FOV of light incident on the second region of nanostructures to a second region of the image plane in which the second FOV may be different from the first FOV, the second region of the image plane may be different from the first region of the image plane, and nanostructures of the second region of nanostructures may include at least one layer of nanostructures formed on the substrate. In one embodiment, nanostructures of the first region of nanostructures may be formed on a first surface of the substrate, and nanostructures of the second region of nanostructures may be formed on the first surface and a second surface of the substrate in which the second surface is opposite the first surface. The substrate may be one of a planar surface and a curved surface.

An example embodiment provides a metalens that may include a first region of nanostructures and a second region of nanostructures. The first region of nanostructures may directs a first FOV of light incident on the first region of nanostructures to a first region of an image plane in which the image plane may substantially coincide with a surface of an image sensor array. The second region of nanostructures may direct a second FOV of light incident on the second region of nanostructures to a second region of the image plane in which the second FOV may be different from the first FOV and the second region of the image plane may be different from the first region of the image plane. In one embodiment, the metalens may further include a third region of nanostructures that may direct a third FOV of light incident on the third region of nanostructures to a third region of the image plane in which the third FOV may be different from the first FOV and the second FOV, and the third region of the image plane may be different from the first region and the second region of the image plane.

BRIEF DESCRIPTION OF THE DRAWING

In the following section, the aspects of the subject matter disclosed herein will be described with reference to exemplary embodiments illustrated in the figure, in which.

DETAILED DESCRIPTION

In the following detailed description, numerous specific details are set forth in order to provide a thorough understanding of the disclosure. It will be understood, however, by those skilled in the art that the disclosed aspects may be practiced without these specific details. In other instances, well-known methods, procedures, components and circuits have not been described in detail not to obscure the subject matter disclosed herein.

Reference throughout this specification to "one embodiment" or "an embodiment" means that a particular feature, structure, or characteristic described in connection with the embodiment may be included in at least one embodiment disclosed herein. Thus, the appearances of the phrases "in one embodiment" or "in an embodiment" or "according to one embodiment" (or other phrases having similar import) in various places throughout this specification may not be necessarily all referring to the same embodiment. Furthermore, the particular features, structures or characteristics may be combined in any suitable manner in one or more embodiments. In this regard, as used herein, the word "exemplary" means "serving as an example, instance, or illustration." Any embodiment described herein as "exemplary" is not to be construed as necessarily preferred or advantageous over other embodiments. Additionally, the particular features, structures, or characteristics may be combined in any suitable manner in one or more embodiments. Also, depending on the context of discussion herein, a singular term may include the corresponding plural forms and a plural term may include the corresponding singular form. Similarly, a hyphenated term (e.g., "two-dimensional," "pre-determined," "pixel-specific," etc.) may be occasionally interchangeably used with a corresponding non-hyphenated version (e.g., "two dimensional," "predetermined," "pixel specific," etc.), and a capitalized entry (e.g., "Counter Clock," "Row Select," "PIXOUT," etc.) may be interchangeably used with a corresponding non-capitalized version (e.g., "counter clock," "row select," "pixout," etc.). Such occasional interchangeable uses shall not be considered inconsistent with each other.

Also, depending on the context of discussion herein, a singular term may include the corresponding plural forms and a plural term may include the corresponding singular form. It is further noted that various figures (including component diagrams) shown and discussed herein are for illustrative purpose only, and are not drawn to scale. Similarly, various waveforms and timing diagrams are shown for illustrative purpose only. For example, the dimensions of some of the elements may be exaggerated relative to other elements for clarity. Further, if considered appropriate, reference numerals have been repeated among the figures to indicate corresponding and/or analogous elements.

The terminology used herein is for the purpose of describing some example embodiments only and is not intended to be limiting of the claimed subject matter. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. The terms "first," "second," etc., as used herein, are used as labels for nouns that they precede, and do not imply any type of ordering (e.g., spatial, temporal, logical, etc.) unless explicitly defined as such. Furthermore, the same reference numerals may be used across two or more figures to refer to parts, components, blocks, circuits, units, or modules having the same or similar functionality. Such usage is, however, for simplicity of illustration and ease of discussion only; it does not imply that the construction or architectural details of such components or units are the same across all embodiments or such commonly-referenced parts/modules are the only way to implement some of the example embodiments disclosed herein.

It will be understood that when an element or layer is referred to as being on, "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numerals refer to like elements throughout. As used herein, the term "and/or" includes any and all combinations of one or more of the associated listed items.

The terms "first," "second," etc., as used herein, are used as labels for nouns that they precede, and do not imply any type of ordering (e.g., spatial, temporal, logical, etc.) unless explicitly defined as such. Furthermore, the same reference numerals may be used across two or more figures to refer to parts, components, blocks, circuits, units, or modules having the same or similar functionality. Such usage is, however, for simplicity of illustration and ease of discussion only; it does not imply that the construction or architectural details of such components or units are the same across all embodiments or such commonly-referenced parts/modules are the only way to implement some of the example embodiments disclosed herein.

Unless otherwise defined, all terms (including technical and scientific terms) used herein have the same meaning as commonly understood by one of ordinary skill in the art to which this subject matter belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

As used herein, the term "module" refers to any combination of software, firmware and/or hardware configured to provide the functionality described herein in connection with a module. For example, software may be embodied as a software package, code and/or instruction set or instructions, and the term "hardware," as used in any implementation described herein, may include, for example, singly or in any combination, an assembly, hardwired circuitry, programmable circuitry, state machine circuitry, and/or firmware that stores instructions executed by programmable circuitry. The modules may, collectively or individually, be embodied as circuitry that forms part of a larger system, for example, but not limited to, an integrated circuit (IC), system on-chip (SoC), an assembly, and so forth.

The subject matter disclosed herein provides a progressive metalens for an imaging or a camera system. In one embodiment, a progressive metalens may have different focal lengths and FOVs at different areas of the metalens. For example, the angular resolution at the sides, or periphery, of the metalens may be compressed while the center of the metalens has a high resolution. That is, the center portion of the progressive metalens may have a relatively longer focal length and narrower FOV, while side portions may have shorter focal length and wider FOV.

In one embodiment, the progressive metalens disclosed herein may provide a near-field FOV having a relatively enlarged FOV with lower spatial resolution, while also providing a far-field FOV having a higher spatial resolution and lower FOV. The progressive lens disclosed herein may allow a larger FOV to be monitored for object detection, while also allowing a lower sensor-spatial resolution having a reduced processing power.

The progressive metalens disclosed herein may provide an improved object detection for a far-field FOV while still being able to monitor a wider range of a near-field FOV. The progressive metalens disclosed herein may be used in Advanced Driver Assist Systems (ADASs), a smartphone, a camera, a mobile telephone, industrial applications, robotic applications, etc., and may cover a combined large FOV so that many objects in a scene may be tracked.

The progressive metalens disclosed herein may be flexibly designed for different applications. The progressive metalens may include a single, a dual or more layers of nanostructures or a set of repeating nanostructures to vary the FOV spatially along the metalens. In one embodiment, the progressive metalens disclosed herein may include discrete steps for different focal lengths, while in another embodiment, the progressive metalens may include a generally continuously changed focal length. In one embodiment, the progressive lens disclosed herein may be implemented using a nanophotonic fabrication technique on a flat or a curved substrate surface.

Figure 1A:
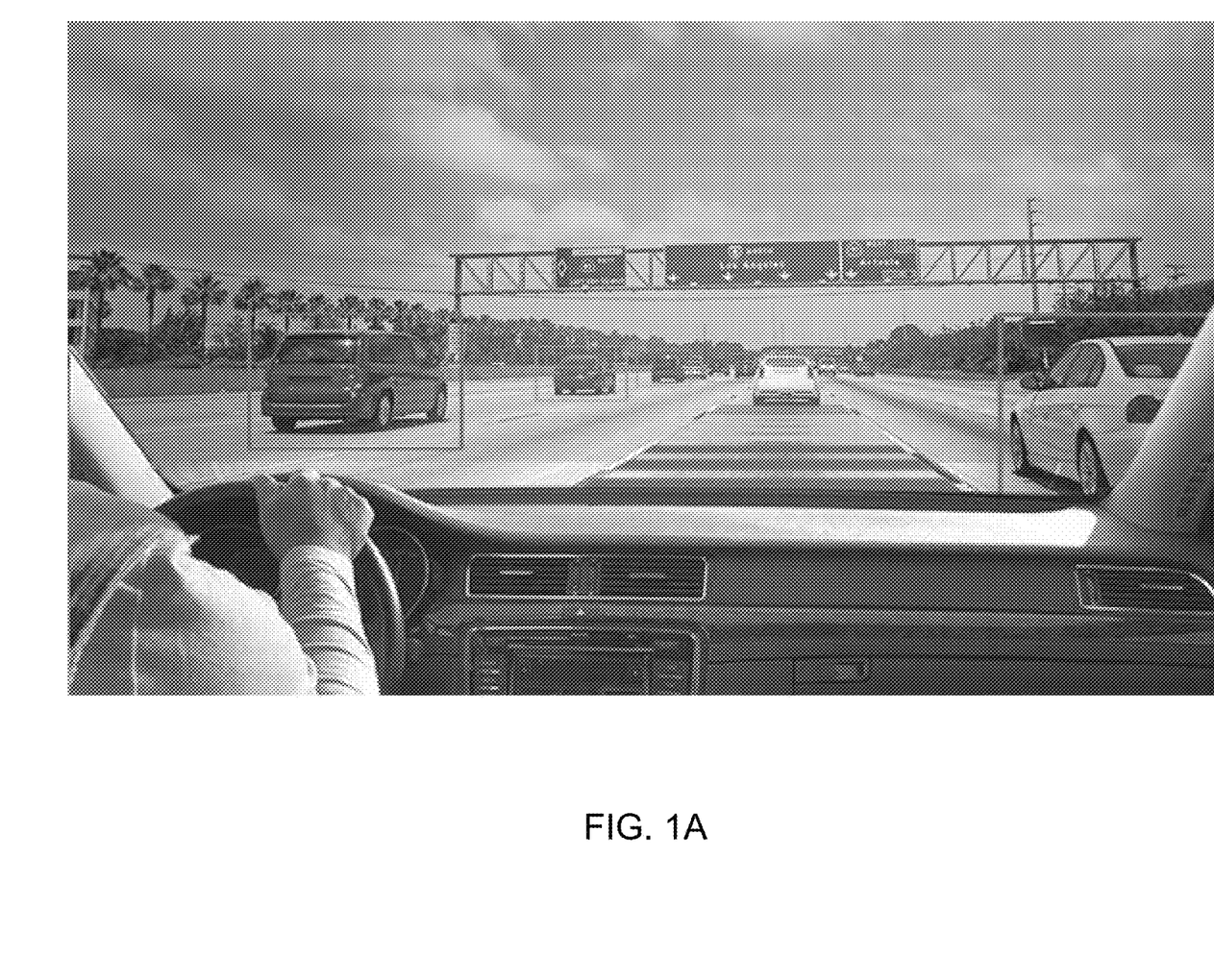
FIG. 1A shows an example FOV that may be seen by a driver of a vehicle.
Figure 1B:
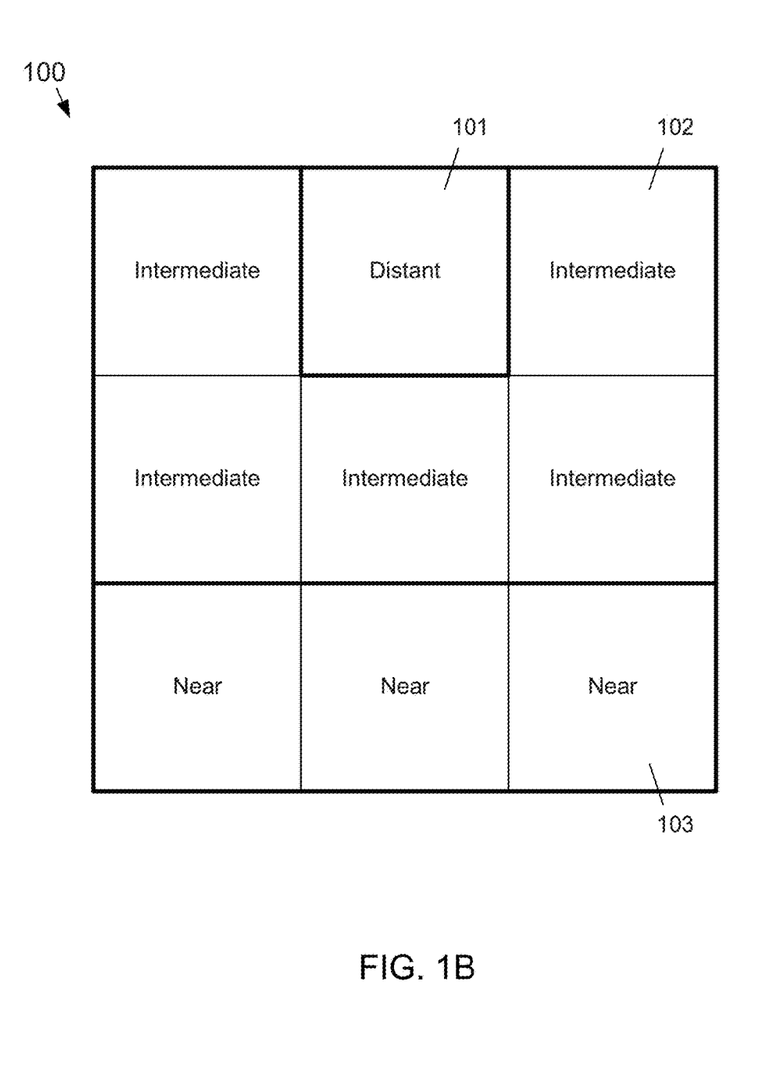
FIG. 1B depicts an example arrangement of different FOVs that may correspond to the view of FIG. 1A and that be used for an image sensor using a progressive metalens according to the subject matter disclosed herein.

FIG. 1A shows an example FOV that may be seen by a driver of a vehicle. FIG. 1B depicts an example arrangement 100 of different FOVs that may correspond to the view of FIG. 1A and that be used for an image sensor using a progressive metalens according to the subject matter disclosed herein. The arrangement 100 may include one or more regions of FOVs 101-103. FOV region 101 (distant) may provide a relatively longer focal length and a relatively narrow FOV. FOV region 102 (intermediate) may provide a shorter focal length and a wider FOV than provided by the FOV region(s) 101. FOV region 103 (near) may provide a relative short focal length and a relatively wide FOV. In one embodiment, the FOV arrangement 100 may be used by an imaging system to cover a large near field FOV (i.e., FOV region 103) while providing improved spatial resolution for intermediate and near FOVs (i.e., intermediate and near FOV regions 102 and 103), and a high resolution for a far-field FOV (i.e., FOV region 101). In one embodiment, a progressive metalens may include FOV regions that correspond to the regions 101-103 of the arrangement 100 by having sub-lens regions that may change in discrete steps or gradually across the metalens.

Figure 2:
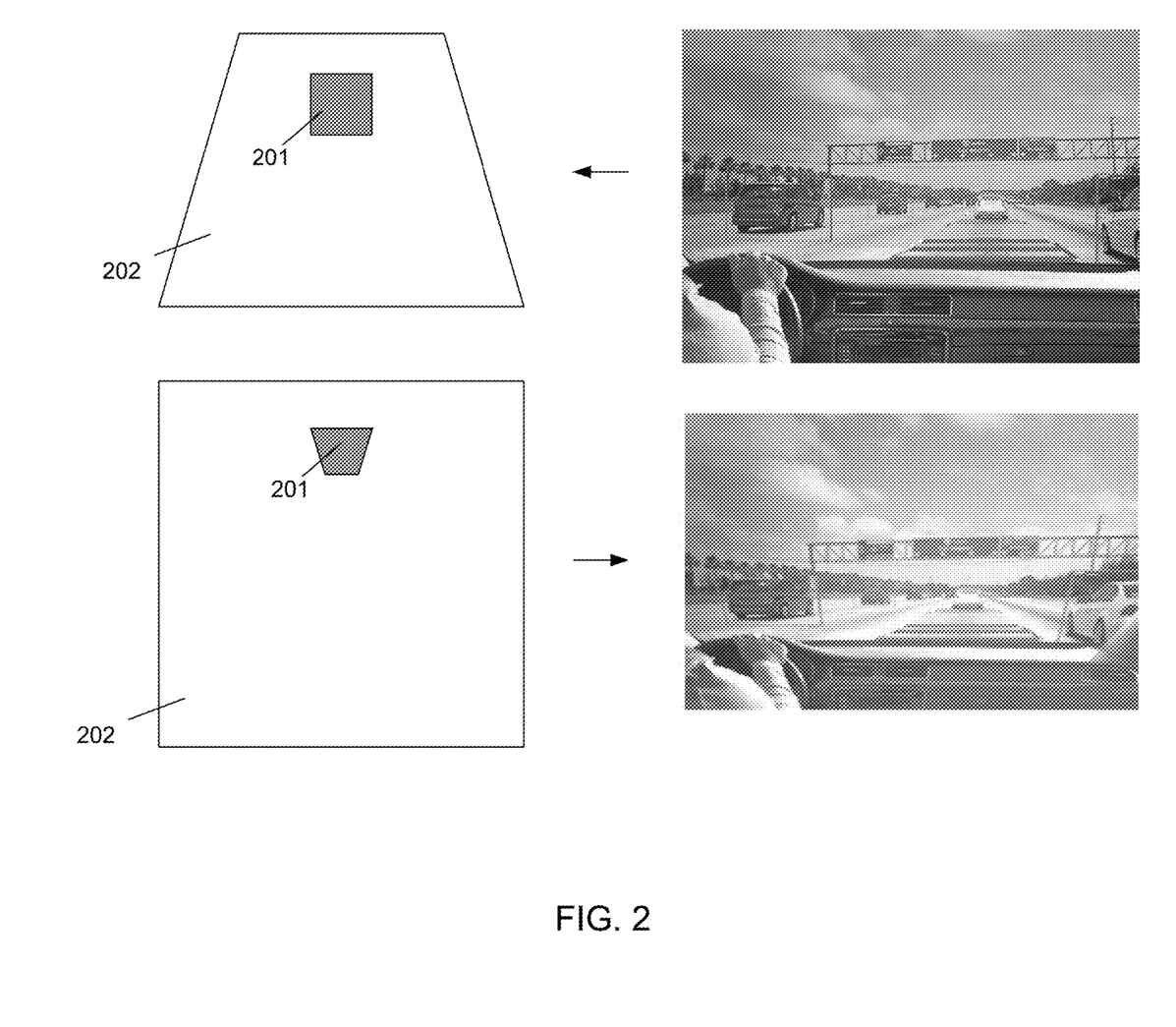
FIG. 2 depicts another example how a progressive metalens may change an FOV across an image plane of an image sensor according to the subject matter disclosed herein.

FIG. 2 depicts another example how a progressive metalens may change an FOV across an image plane of an image sensor. At the top right of FIG. 2, an example FOV is shown that may be seen by a driver of a vehicle. At the top left of FIG. 2, a portion of a focal plane 201 of a metalens (not shown) is shown with respect to an image plane 202 of an image sensor (also not shown). The focal plane 201 is parallel to the image seen by the driver of the vehicle (and the point of view of FIG. 2), whereas the image plane 202 is an angle to the focal plane 201. Consequently, the point of view causes the image plane 202 to appear to be a trapezoidal shape.

At bottom left of FIG. 2, the portion of the focal plane 201 and the image plane 202 are depicted in which the image plane 202 is being viewed from the point of view of FIG. 2 (i.e., perpendicularly from (i.e., normal to) the surface of the image plane 202 (and the sheet of the page)). From this point of view, the focal plane 201 in FIG. 2 appears to be trapezoidally shaped. The focal plane of a progressive metalens may be arranged based on the focal plane 201 in FIG. 2. At the bottom right of FIG. 2, an image is shown that is focused on the image plane 202 by a progress metalens arranged based on the focal plane 201 in FIG. 2. Distortions in the image at the image plane that may be caused by a progressive metalens may be seen.

Figure 3A:
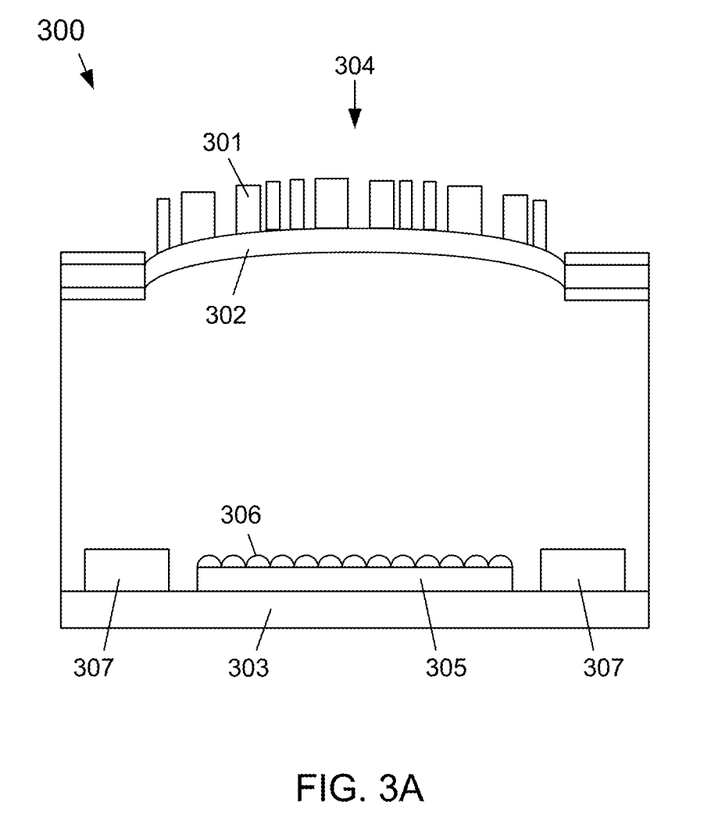
FIG. 3A depicts an example embodiment of a progressive metalens according to the subject matter disclosed herein.

FIG. 3A depicts an example embodiment of a progressive metalens 300 according to the subject matter disclosed herein. The metalens 300 may include one or more layers of nanostructures 301 formed on a substrate 302, such as glass or another transparent substrate, such as plastic or any low index organic/inorganic materials that are optically transparent in visible-NIR (400 nm-1000 nm). The nanostructures 301 may be referred to herein as scatterers and/or nanoantennas. The substrate 302 for the metalens 300 may be flat or curved, and may be formed as, for example, a cover for a sensor chip 303, may be formed as part of a main lens assembly (not shown), or, as depicted in FIG. 3A, as a separate piece. In one embodiment, the metalens 300 may be module, or assembly, that is part of an optical stack of, for example, an imaging system or a camera.

The metalens 300 may diffract and/or focus incident light 304 onto a pixel array 305 on the sensor chip 303. In one embodiment, the pixel array 305 may include an optional microlens 306. The pixel array 305 may be a single pixel array or multiple pixel arrays arranged to receive light diffracted and/or focused by the metalens 300. In one embodiment, the pixel array 305 may be one or more individual 2D and 3D pixel arrays. In another embodiment, the pixel array 305 may be one or more hybrid 2D and 3D pixel arrays. Peripheral components 307 that support the pixel arrays may also be formed on the sensor chip 303.

Figure 3B:
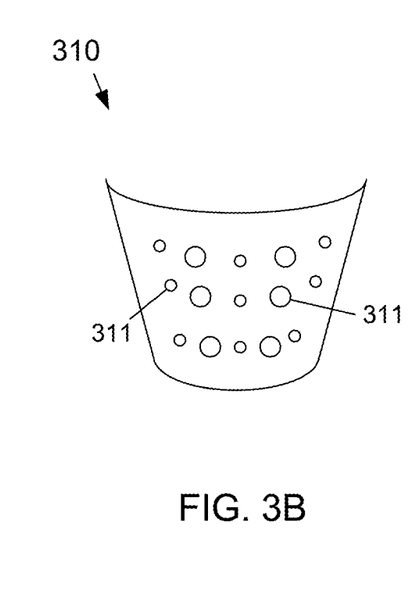
FIG. 3B depicts a top view of an example metalens showing that a metalens may have a shape that may be adapted to provide FOVs for any application according to the subject matter disclosed herein.

FIG. 3B depicts a top view of an example metalens 310 showing that a metalens may have a shape that may be adapted to provide FOVs for any application. Locations of nanostructures 311 on the metalens 310 may also be adapted to provide one or more FOVs for any application.

Figure 4A:
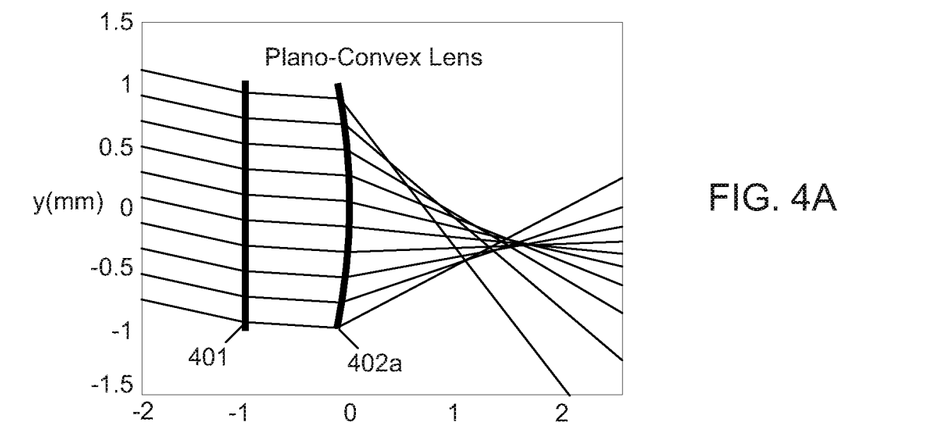
FIGS. 4A-4C are graphs respectively showing general diffraction and/or focusing of light by example shaped metalenses.
Figure 4B:
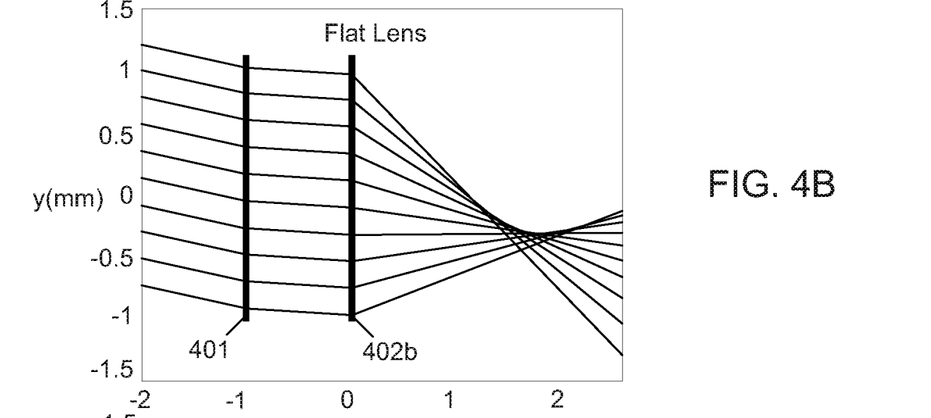
Figure 4C:
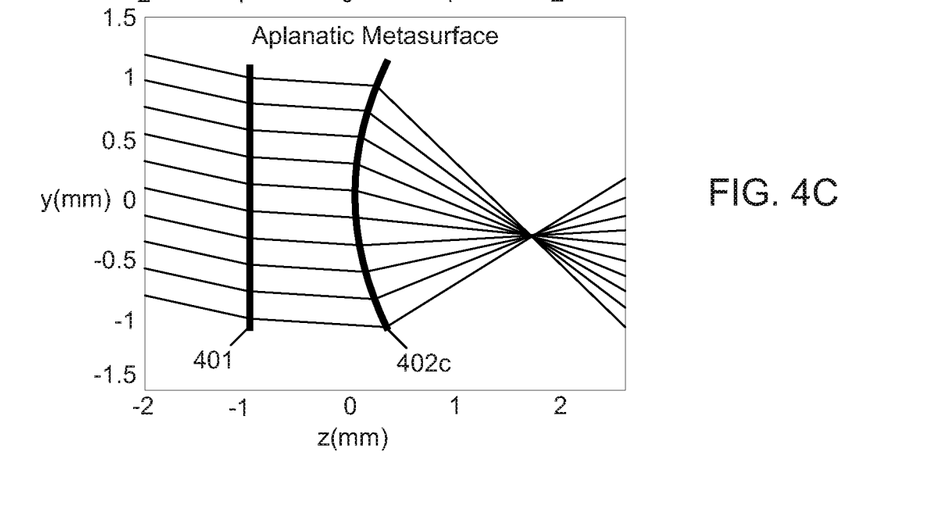

FIGS. 4A-4C are graphs respectively showing general diffraction and/or focusing of light by example shaped metalenses. The abscissas and the ordinates of FIGS. 4A-4C are millimeters. FIG. 4A shows the general diffraction/focusing characteristics of a plano-convex-shaped metalens. FIG. 4B shows the general diffraction/focusing characteristics of a flat metalens. FIG. 4C shows the general diffraction/focusing characteristics of an aplanatic metalens. In FIGS. 4A-4C, light is incident upon a main lens 401 and the metalens 402a-402c from the left and is diffracted/focused to the right.

Figure 5A:
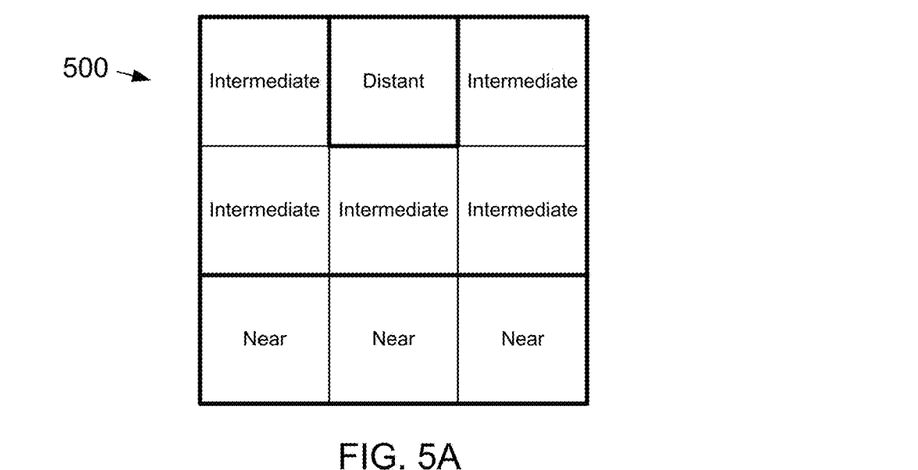
FIGS. 5A-5C depict example arrangements of focal lengths for a metalens according to the subject matter disclosed herein.
Figure 5B:
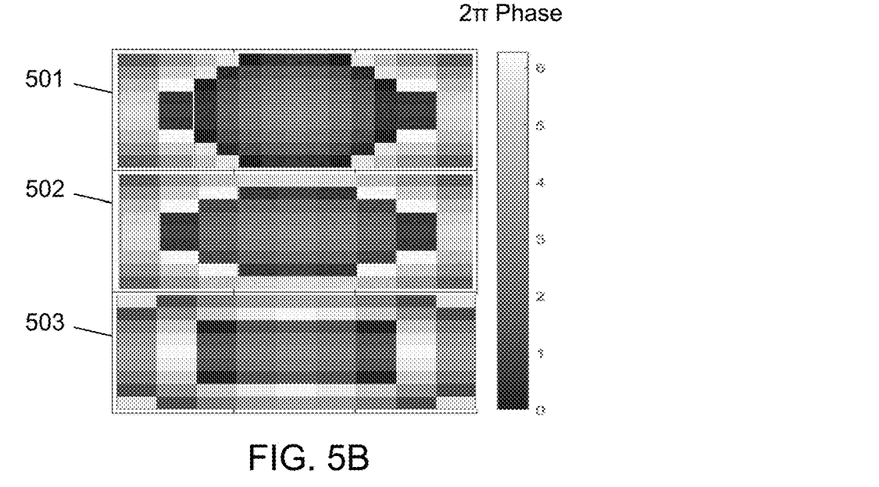
Figure 5C:
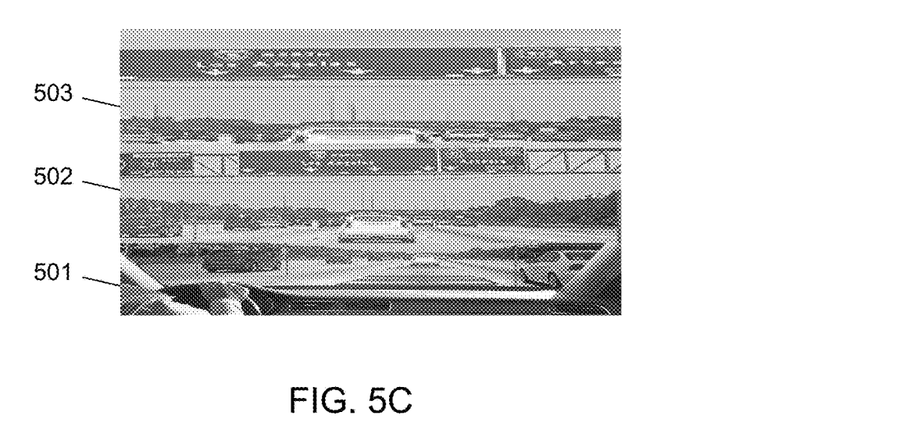

FIGS. 5A-5C depict example arrangements of focal lengths for a metalens according to the subject matter disclosed herein. FIG. 5A depicts an example arrangement 500 of different FOVs that be used for an image sensor using a progressive metalens according to the subject matter disclosed herein. The arrangement 500 corresponds to the arrangement 100 in FIG. 1B.

FIG. 5B depicts diffraction/focusing of light by a progressive metalens onto an image plane 501 of an image sensor. A first region 501 of the image plane may correspond to a relatively longer focal length and a relatively narrow FOV (i.e., a "distant" region of the arrangement 500). A second region 502 of the image plane may correspond to a shorter focal length and a wider FOV (i.e., an "intermediate" region of the arrangement 500) than region 501. A third region 503 of the image plane may correspond to a relative short focal length and a relatively wide FOV (i.e., a "near" region of the arrangement 500). FIG. 5C depicts the three FOV regions including distortions that may be added by the progressive metalens.

Figure 6A:
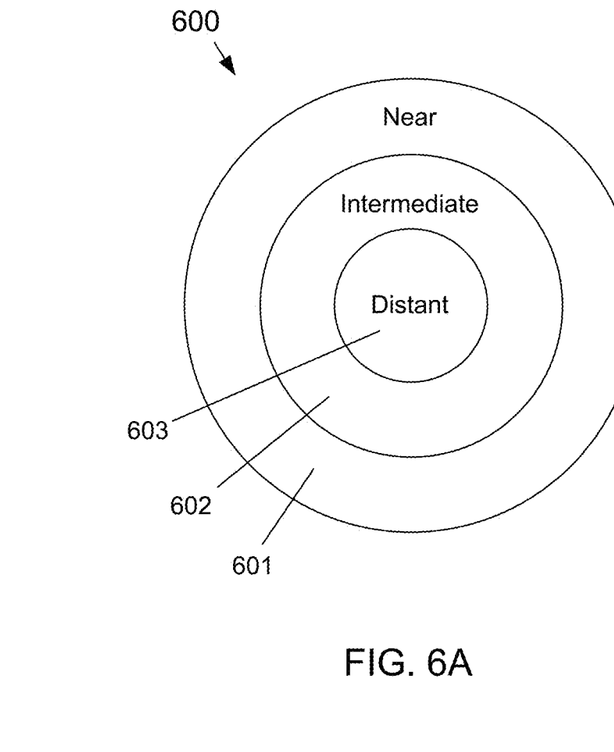
FIG. 6A depicts an example radial arrangement of focal lengths for a circularly shaped progressive metalens according to the subject matter disclosed herein.

FIG. 6A depicts an example radial arrangement of focal lengths for a circularly shaped progressive metalens 600 according to the subject matter disclosed herein. A near focal-length region 601 may be arranged around the outside of a circularly shaped metalens 600. An intermediate focal-length region 602 may be arranged inside of the near focal-length region 601. A distant focal-length region may be arranged near the center of the circularly shaped metalens 600. The individual area shapes 601-603 may be any size to tune the horizontal and vertical (H×V) angular resolution of an image sensor (not shown). The global shape may be any shape to tune the FOV spatially.

In the embodiment depicted in FIG. 6A, the region 602 may be surrounded by the region 601, and the region 603 may be surrounded by the region 602. In other embodiments, the size and shape of the different regions may be selected based on the application. Additionally, in other embodiments, any number of different focal-length regions may be used.

Figure 6B:
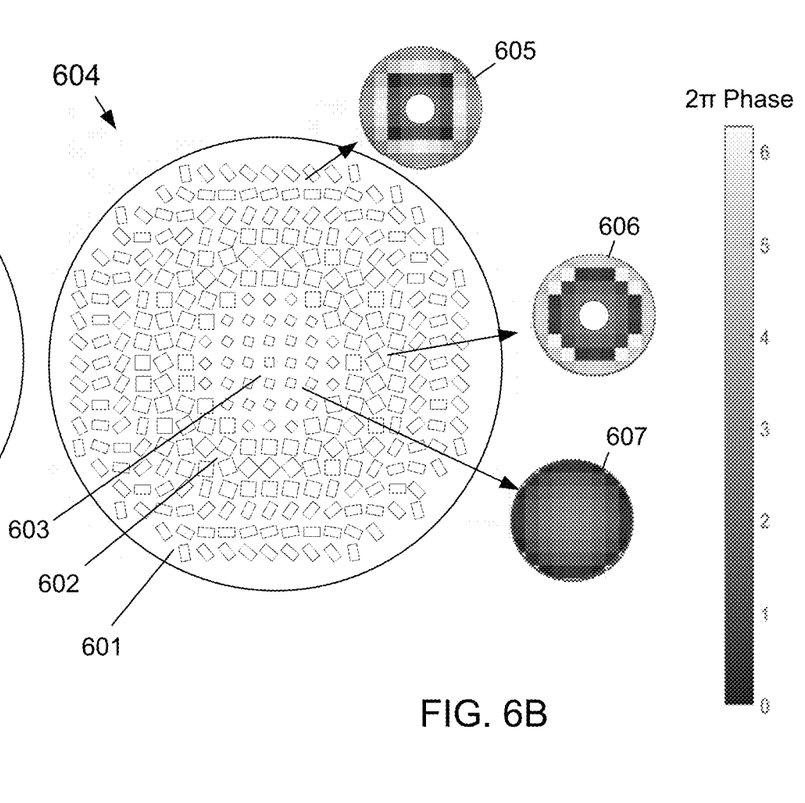
FIG. 6B depicts an example arrangement of nanostructures that corresponds to the radial arrangement depicted in FIG. 6A according to the subject matter disclosed herein.

FIG. 6B depicts an example arrangement 604 of nanostructures that corresponds to the radial arrangement depicted in FIG. 6A. Images 605-607 respectively depict phases of an image at an image plane corresponding to the individual area shapes 601-603.

Figure 7:
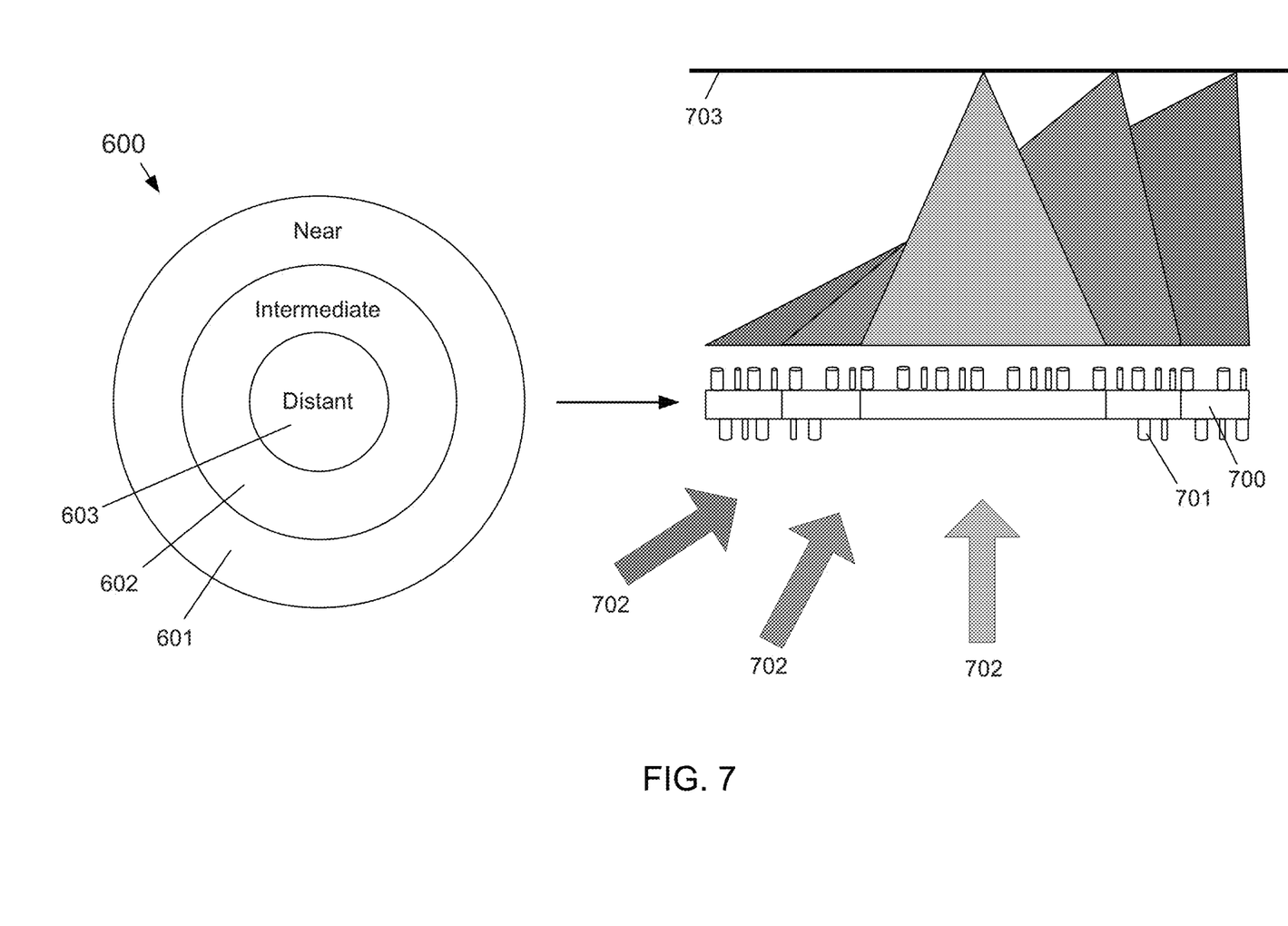
FIG. 7 depicts example radial arrangement of focal lengths for a circularly shaped progressive metalens depicted in FIG. 6A according to the subject matter disclosed herein.

FIG. 7 depicts example radial arrangement of focal lengths for a circularly shaped progressive metalens 600 depicted in FIG. 6A according to the subject matter disclosed herein. The different shades of gray correspond to different focal lengths. The nanostructures 701 formed on a metalens 700 focus the incident light 702 at different locations on an image plane 703.

Figure 8:
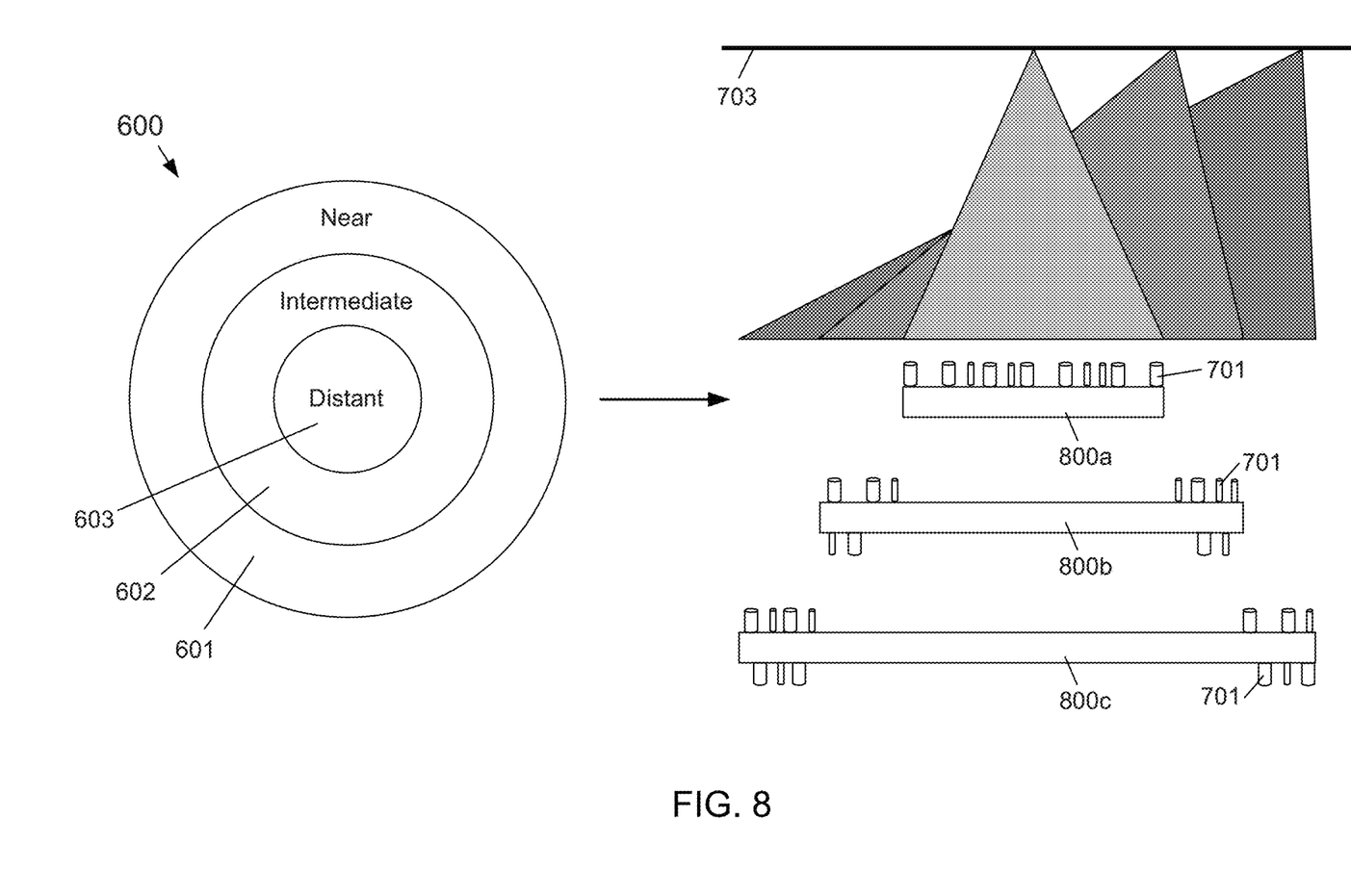
FIG. 8 depicts how nanostructures may be configured as single or dual layers on one or more substrates of the circularly shaped progressive metalens of FIG. 6A to control the FOVs spatially according to the subject matter disclosed herein.

FIG. 8 depicts how nanostructures 701 may be configured as single or dual layers on one or more substrates 800a-800c of the circularly shaped progressive metalens 600 of FIG. 6A to control the FOVs spatially according to the subject matter disclosed herein. The different shades of gray correspond to different focal lengths.

Figure 9:
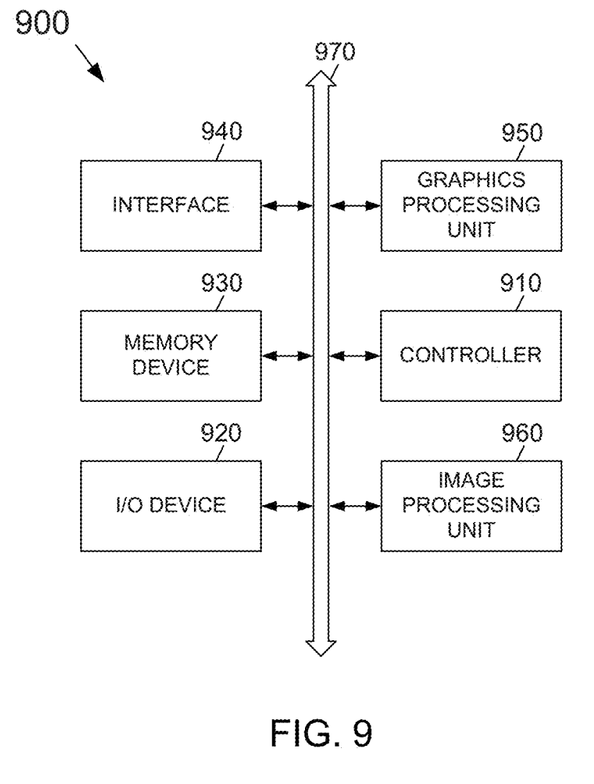
FIG. 9 depicts an electronic device that includes an imaging system that includes a progressive metalens may have different focal lengths and FOVs at different areas of the metalens according to the subject matter disclosed herein.

FIG. 9 depicts an electronic device 900 that includes an imaging system that includes a progressive metalens may have different focal lengths and FOVs at different areas of the metalens according to the subject matter disclosed herein. Electronic device 900 may be used in, but not limited to, a computing device, a personal digital assistant (PDA), a laptop computer, a mobile computer, a web tablet, a wireless phone, a cell phone, a smart phone, a digital music player, or a wireline or wireless electronic device. The electronic device 900 may also be part of, but not limited to, an ADAS, a mobile-device imaging system, an industrial imaging system, robotics, etc. The electronic device 900 may include a controller 910, an input/output device 920 such as, but not limited to, a keypad, a keyboard, a display, a touch-screen display, a camera, and/or an image sensor, a memory 930, an interface 940, a GPU 950, and an imaging processing unit 960 that are coupled to each other through a bus 970. The controller 910 may include, for example, at least one microprocessor, at least one digital signal processor, at least one microcontroller, or the like. The memory 930 may be configured to store a command code to be used by the controller 910 or a user data.

Electronic device 900 and the various system components of electronic device 900 may include the image processing unit 960. In one embodiment, the image processing unit may be part of an imaging system that includes a progressive metalens may have different focal lengths and FOVs at different areas of the metalens according to the subject matter disclosed herein. The interface 940 may be configured to include a wireless interface that is configured to transmit data to or receive data from a wireless communication network using a RF signal. The wireless interface 940 may include, for example, an antenna, a wireless transceiver and so on. The electronic system 900 also may be used in a communication interface protocol of a communication system, such as, but not limited to, Code Division Multiple Access (CDMA), Global System for Mobile Communications (GSM), North American Digital Communications (NADC), Extended Time Division Multiple Access (E-TDMA), Wideband CDMA (WCDMA), CDMA2000, Wi-Fi, Municipal Wi-Fi (Muni Wi-Fi), Bluetooth, Digital Enhanced Cordless Telecommunications (DECT), Wireless Universal Serial Bus (Wireless USB), Fast low-latency access with seamless handoff Orthogonal Frequency Division Multiplexing (Flash-OFDM), IEEE 802.20, General Packet Radio Service (GPRS), iBurst, Wireless Broadband (WiBro), WiMAX, WiMAX-Advanced, Universal Mobile Telecommunication Service—Time Division Duplex (UMTS-TDD), High Speed Packet Access (HSPA), Evolution Data Optimized (EVDO), Long Term Evolution—Advanced (LTE-Advanced), Multichannel Multipoint Distribution Service (MMDS), and so forth.

Embodiments of the subject matter and the operations described in this specification may be implemented in digital electronic circuitry, or in computer software, firmware, or hardware, including the structures disclosed in this specification and their structural equivalents, or in combinations of one or more of them. Embodiments of the subject matter described in this specification may be implemented as one or more computer programs, i.e., one or more modules of computer-program instructions, encoded on computer-storage medium for execution by, or to control the operation of, data-processing apparatus. Alternatively or in addition, the program instructions can be encoded on an artificially-generated propagated signal, e.g., a machine-generated electrical, optical, or electromagnetic signal, that is generated to encode information for transmission to suitable receiver apparatus for execution by a data processing apparatus. A computer-storage medium can be, or be included in, a computer-readable storage device, a computer-readable storage substrate, a random or serial-access memory array or device, or a combination thereof. Moreover, while a computer-storage medium is not a propagated signal, a computer-storage medium may be a source or destination of computer-program instructions encoded in an artificially-generated propagated signal. The computer-storage medium can also be, or be included in, one or more separate physical components or media (e.g., multiple CDs, disks, or other storage devices). Additionally, the operations described in this specification may be implemented as operations performed by a data-processing apparatus on data stored on one or more computer-readable storage devices or received from other sources.

While this specification may contain many specific implementation details, the implementation details should not be construed as limitations on the scope of any claimed subject matter, but rather be construed as descriptions of features specific to particular embodiments. Certain features that are described in this specification in the context of separate embodiments may also be implemented in combination in a single embodiment. Conversely, various features that are described in the context of a single embodiment may also be implemented in multiple embodiments separately or in any suitable subcombination. Moreover, although features may be described above as acting in certain combinations and even initially claimed as such, one or more features from a claimed combination may in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Thus, particular embodiments of the subject matter have been described herein. Other embodiments are within the scope of the following claims. In some cases, the actions set forth in the claims may be performed in a different order and still achieve desirable results. Additionally, the processes depicted in the accompanying figures do not necessarily require the particular order shown, or sequential order, to achieve desirable results. In certain implementations, multitasking and parallel processing may be advantageous.

As will be recognized by those skilled in the art, the innovative concepts described herein may be modified and varied over a wide range of applications. Accordingly, the scope of claimed subject matter should not be limited to any of the specific exemplary teachings discussed above, but is instead defined by the following claims.

What is claimed is:

1. A metalens, comprising:
a first region of nanostructures that directs a first field of view (FOV) of light incident on the first region of nanostructures to a first region of an image plane; and
a second region of nanostructures that directs a second FOV of light incident on the second region of nanostructures to a second region of the image plane, the second FOV being different from the first FOV, and the second region of the image plane being different from the first region of the image plane.

2. The metalens of claim 1, further comprising a third region of nanostructures that directs a third FOV of light incident on the third region of nanostructures to a third region of the image plane, the third FOV being different from the first FOV and the second FOV, and the third region of the image plane being different from the first region and the second region of the image plane.

3. The metalens of claim 2, wherein the first region of nanostructures is arranged to surround the second region of nanostructures and the second region of nanostructures is arranged to surround the third region of nanostructures.

4. The metalens of claim 2, wherein the first region of nanostructures is arranged to be adjacent to the second region of nanostructures, and the third region of nanostructures is arranged to be adjacent to the second region of nanostructures.

5. The metalens of claim 1, wherein the image plane substantially coincides with a surface of an image sensor array.

6. The metalens of claim 1, wherein nanostructures of the first region and the second region of nanostructures comprises at least one layer of nanostructures formed on a substrate.

7. The metalens of claim 6, wherein nanostructures of the first region of nanostructures are formed on a first surface of the substrate, and nanostructures of the second region of nanostructures are formed on the first surface and a second surface of the substrate, the second surface being opposite the first surface.

8. The metalens of claim 6, wherein the substrate comprises one of a planar surface and a curved surface.

9. The metalens of claim 1, wherein the metalens is part of one of an advanced driver assist system (ADAS), a smartphone, and a camera.

10. A metalens, comprising:
a first region of nanostructures that directs a first field of view (FOV) of light incident on the first region of nanostructures to a first region of an image plane, and nanostructures of the first region of nanostructures comprising at least one layer of nanostructures formed on a substrate; and
a second region of nanostructures that directs a second FOV of light incident on the second region of nanostructures to a second region of the image plane, the second FOV being different from the first FOV, the second region of the image plane being different from the first region of the image plane, and nanostructures of the second region of nanostructures comprising at least one layer of nanostructures formed on the substrate.

11. The metalens of claim 10, wherein nanostructures of the first region of nanostructures are formed on a first surface of the substrate, and nanostructures of the second region of nanostructures are formed on the first surface and a second surface of the substrate, the second surface being opposite the first surface.

12. The metalens of claim 11, wherein the substrate comprises one of a planar surface and a curved surface.

13. The metalens of claim 11, further comprising a third region of nanostructures that directs a third FOV of light incident on the third region of nanostructures to a third region of the image plane, the third FOV being different from the first FOV and the second FOV, and the third region of the image plane being different from the first region and the second region of the image plane.

14. The metalens of claim 13, wherein the first region of nanostructures is arranged to surround the second region of nanostructures and the second region of nanostructures is arranged to surround the third region of nanostructures.

15. The metalens of claim 13, wherein the first region of nanostructures is arranged to be adjacent to the second region of nanostructures, and the third region of nanostructures is arranged to be adjacent to the second region of nanostructures.

16. The metalens of claim 10, wherein the image plane substantially coincides with a surface of an image sensor array.

17. The metalens of claim 10, wherein the metalens is part of one of an advanced driver assist system (ADAS), a smartphone, and a camera.

18. A metalens, comprising:
    a first region of nanostructures that directs a first field of view (FOV) of light incident on the first region of nanostructures to a first region of an image plane, the image plane substantially coinciding with a surface of an image sensor array; and
    a second region of nanostructures that directs a second FOV of light incident on the second region of nanostructures to a second region of the image plane, the second FOV being different from the first FOV, and the second region of the image plane being different from the first region of the image plane.

19. The metalens of claim 18, further comprising a third region of nanostructures that directs a third FOV of light incident on the third region of nanostructures to a third region of the image plane, the third FOV being different from the first FOV and the second FOV, and the third region of the image plane being different from the first region and the second region of the image plane.

20. The metalens of claim 19, wherein the metalens is part of one of an advanced driver assist system (ADAS), a smartphone, and a camera.

* * * * *